United States Patent [19]

Case et al.

[11] Patent Number: 5,334,833
[45] Date of Patent: Aug. 2, 1994

[54] SENSITIVITY FUNCTION TECHNIQUE FOR MODELING NUCLEAR TOOLS

[75] Inventors: Charles Case, West Redding; Charles Watson, Danbury, both of Conn.; Richard Lawrence, Stormville, N.Y.

[73] Assignee: Schlumberger Technology Corporation, New York, N.Y.

[21] Appl. No.: 716,463

[22] Filed: Jun. 14, 1991

[51] Int. Cl.$^5$ .............................................. G01V 5/12
[52] U.S. Cl. ...................................... 250/270; 364/422
[58] Field of Search ............... 250/256, 264, 270, 266; 364/422; 324/333, 338

[56] References Cited

U.S. PATENT DOCUMENTS

| | | | |
|---|---|---|---|
| 3,321,625 | 5/1967 | Wahl . | |
| 3,864,569 | 2/1975 | Tittman | 260/264 |
| 4,048,495 | 9/1977 | Ellis | 250/264 |
| 4,314,339 | 2/1982 | Kenyon | 364/422 |
| 4,958,073 | 9/1990 | Becker et al. | 250/269 |

OTHER PUBLICATIONS

"Monte Carlo Computation of Differential Sensitivity Function", Watson, *Transactions of the American Nuclear Society*, vol. 46, Jun. 3–7, 1984, pp. 655–657.

"Deconvolution of Petrophysical Logs: Applications and Limitations," W. J. Looyestijn, *SPWLA Twenty–Third Annual Logging Symposium*, Jul. 6–9, 1982.

"Quantitative Uranium Determinations from Gamma-Ray Logs by Application of Digital Time Series Analysis," J. G. Conaway and P. G. Killeen, *Geophysics*, vol. 43, No. 6, Oct., 1978, pp. 1204–1221.

"Analysis of Deconvolution Efficiency for Some Well Logs," T. Zorski, *SPWLA Twenty–Eighth Annual Logging Symposium*, Jun. 29–Jul. 2, 1987.

"Enhanced Vertical Resolution Processing of Dual-Spaced Neutron and Density Tools Using Standard Shop Calibration and Borehole Compensation Procedures," M. P. Smith, *SPWLA 31st Annual Logging Symposium*, Jun. 24–27, 1990.

"An Algorithm for Simultaneous Deconvolution, Squaring and Depth–Matching of Logging Data," M. R. Spalburg, *SPWLA Thirtieth Annual Logging Symposium*, Jun. 11–14, 1989.

"Thin Bed Resolution Enhancement: Potential and Pitfalls," D. C. Minette, *SPWLA 31st Annual Logging Symposium*, Jun. 24–27, 1990.

"Simulation of Geological Profiled and Gamma Ray Logs," J. A. Czubek, *Nucl. Geophys.* vol. 1, No. 1, pp. 83–109, 1987.

"A Method of Geometrical Factors in the Theory and Interpretation of Formation Density Logging," D. A. Kozhevnikov and I. P. Khathmullin *Nucl. Geophys.* vol. 4, No. 4, pp. 413–424, 1990.

(List continued on next page.)

*Primary Examiner*—Paul M. Dzierzynski
*Assistant Examiner*—David V. Bruce
*Attorney, Agent, or Firm*—Leonard W. Pojunas

[57] ABSTRACT

A new technique, called the sensitivity function technique, has been developed for modeling nuclear density tools. Specifically, sensitivity functions relate a change in formation properties to a change in detector response and are based on the first order perturbation expansion of the radiation transport equation. The sensitivity function is a quasi-linear model which works extremely well over a wide range of mudcake and formation conditions, as shown by extensive benchmark comparisons against actual tool measurements. The detector responses are calculated by a convolution of density sensitivity functions, calculated in a separate set of Monte Carlo computer runs, with the formation properties and is extremely fast. Because this technique is both fast and accurate, it represents a significant advance in the ability to model gamma-gamma density tools and will allow the use of fast forward modeling to improve the log interpretation process.

6 Claims, 9 Drawing Sheets

OTHER PUBLICATIONS

"Vertical Enhancement by Combination and Transformation of Associated Responses," P. A. S. Elkington et al., *SPWLA 31st Annual Logging Symposium*, Jun. 24–27, 1990.

"Characterization of Vertical Resolution for Pe and Density Logging," G. L. Mathis and D. Gearhart, *SPWLA Twenty-Ninth Annual Logging Symposium*, Jun. 5–8, 1988.

"Resolution Enhancement of Nuclear Measurements Through Deconvolution," L. A. Jacobson et al., *Log Analyst*, Nov.–Dec., 1991, pp. 663–669.

"Dual Spacing Formation Density Log", Wahl et al., *Journal of Petroleum Technology*, Dec. 1964, pp. 1411–1416.

"Eliminating the Effect of Rugosity from Compensated Density Logs by Geometrical Response Matching", Flaum et al., *SPE 19612*, pp. 419–427.

"Application of Sensitivity and Uncertainty Methodology to Fast Reactor Integral Experiment Analysis," Weisbin et al., *Nucl. Sci. Eng.*, 66, 307, 1978.

"Cross Section Sensitivity and Uncertainty Analysis with Application to a Fusion Reactor," Gerstl et al., *Nuc. Sci. Eng.*, 62, 137, 1977.

"The Physical Foundations of Formation Lithology Logging with Gamma Rays", Bertozzi et al., *Geophysics*, 46, No. 10, Oct. 1981.

"A Code Generated Monte Carlo Importance Function," Hendricks, J. S., *Trans. Am. Nuc. Soc.*, 41, 307, 1982.

Create a new formation description in which each radial/vertical region has arbitrary formation properties. ~4a Convolve the sensitivity values ($S_{c_i}$ and $S_{\tau_i}$) with the new formation properties to predict a detector response relative to the detector response calculated in the reference formation.

SEE EQUATION (12)
~4b

"Move" the formation properties down one vertical interval to simulate the sonde moving up the borehole and calculate a detector response for this "new" formation description. ~4c Repeat above step until a log of count rates are produced.

Detector Response

Depth
~4d

Signal process detector responses into estimates of formation properties.

Formation Property

Depth
~4e

SENSITIVITY FUNCTION TECHNIQUE FOR MODELING NUCLEAR TOOLS

FIELD OF THE INVENTION

The invention concerns a well logging method using nuclear modeling and more specifically concerns a well logging method in which sensitivity functions are used to rapidly estimate the response of nuclear well logging tools to arbitrary formation conditions for more accurate log interpretation.

BACKGROUND

In nuclear oil well logging, a tool is lowered into an oil well and slowly withdrawn. During the removal process, nuclear particles are emitted into the surrounding formation and scattered radiation is detected as a function of depth. This recorded "log" is then interpreted into estimates of the formation's properties.

One such tool, for measuring the density and $P_e$, photoelectric absorportion factor, of a formation surrounding the borehole, comprises a sonde body containing a gamma ray radioisotopic source and two gamma ray detectors. The detectors are typically NaI crystal scintillators which are spaced in the tool from the gamma ray source. "The Dual Spacing Formation Density Log", *Journal of Petroleum Technology*; Wahl, et al., December 1964 pp. 1411–1416, and U.S. Pat. Nos. 3,321,625 to Wahl, 3,864,569 to Tillman, and 4,048,495 to Ellis describe such a device in detail. These references describe the count rate of the far detector as an exponential function of the formation density. However, the mudcake in the borehole and borehole rugosity also affect the count rate of the far detector. For this reason, a second detector, the near detector, obtains information which is used to compensate for the effects of mudcake and rugosity on the far detector.

The Wahl article describes the compensation for the effects of mudcake and rugosity, which is known as the "spine-and-ribs" method. The spine-and-ribs method plots the short spacing detector counting rate for a particular energy window against the long spacing detector counting rate for a different energy window. The "spine", which has been developed through laboratory measurements, reflects the detector responses for variations in formation density only. The "ribs" extend from the spine and reflect the effect of mudcake thickness and mudcake density on the readings.

Thus, by using the count rates of the detectors as inputs, one finds a cross-plot location corresponding to a point on a rib extending from the spine. One then determines formation density by tracing the rib on which the point is located back to the spine, with the intersection of the rib and spine dictating the formation density, and the location on the rib dictating mudcake parameters.

Computer simulations are often used to predict the detector responses of such gamma-gamma density logging tools or other nuclear well logging tools. This routinely involves the use of 3-D Monte Carlo codes like MCNP (LASL Group X-6, "MCNP—A General Monte Carlo Code for Neutron and Photon Transport, Version 2B," LA-7396-M, Rev., Los Alamos National Lab., 1981) to solve the radiation transport equation under various combinations of mudcake and formation conditions. The major advantage of the Monte Carlo method (over other computational methods such as discrete ordinates) is that it can explicitly model the often asymmetric geometric details of both the tool and borehole environment. The major disadvantage is that the Monte Carlo method yields answers that are statistical in nature and therefore may require many cpu hours of computer time to achieve acceptable precision.

Modeling studies have typically involved estimating the response of a tool in a homogeneous formation. Under these conditions, a single calculation is sufficient to characterize the tool's response. If, on the other hand, the effects of borehole rugosity (i.e. borehole irregularities having a spatial scale which is smaller than the source-to-detector spacings) on density measurements were being studied, an estimated log of detector responses would be required. To generate this log with conventional Monte Carlo methods would require hundreds of cpu hours.

Creating a log of detector responses is computationally intensive because it involves a separate computer run for each tool position within the borehole. As the tool "moves up the borehole", the relative location of the tool with respect to the formation's heterogeneous features or borehole rugosity changes, and therefore a new model is needed for each vertical interval. A log can be simulated by interpolating between discrete stationary estimates of the detector responses. The inventors have used this approach to successfully predict the response of a neutron porosity tool past thin beds and isolated bed boundaries, but it required a large amount of computer time to simulate only a few thin bed cases. Thus, the need existed for the development of a more computationally efficient technique to make modeling a viable option for studying spatially inhomogeneous problems.

SUMMARY OF THE INVENTION

A specific embodiment of this invention concerns an improved well logging technique. The method involves the use of sensitivity functions to predict detector responses of nuclear logging tools to arbitrary formation properties. The sensitivity functions themselves are derived via Monte Carlo calculations and take into account the 3-D geometric details of the tool design and tool positioning in the borehole.

A synthetic log produced from predicted detector responses is compared to an actual log of data representing estimated formation properties. The estimated properties are modified until the synthetic log and actual log are substantially similar. When this similarity occurs, the optimal formation properties are evident.

Even though the sensitivity function technique is based on a linear approximation to the generally nonlinear relation between tool responses and formation properties, it has been found to be very accurate over a wide range of mudcake and formation conditions. Its major advantage is that it is computationally faster and more efficient to perform than a complete solution of the radiation transport equation using the Monte Carlo method. This makes it possible for the invention to be used in the field to improve the log interpretation process.

DETAILED DESCRIPTION OF THE INVENTION

Figure 1:
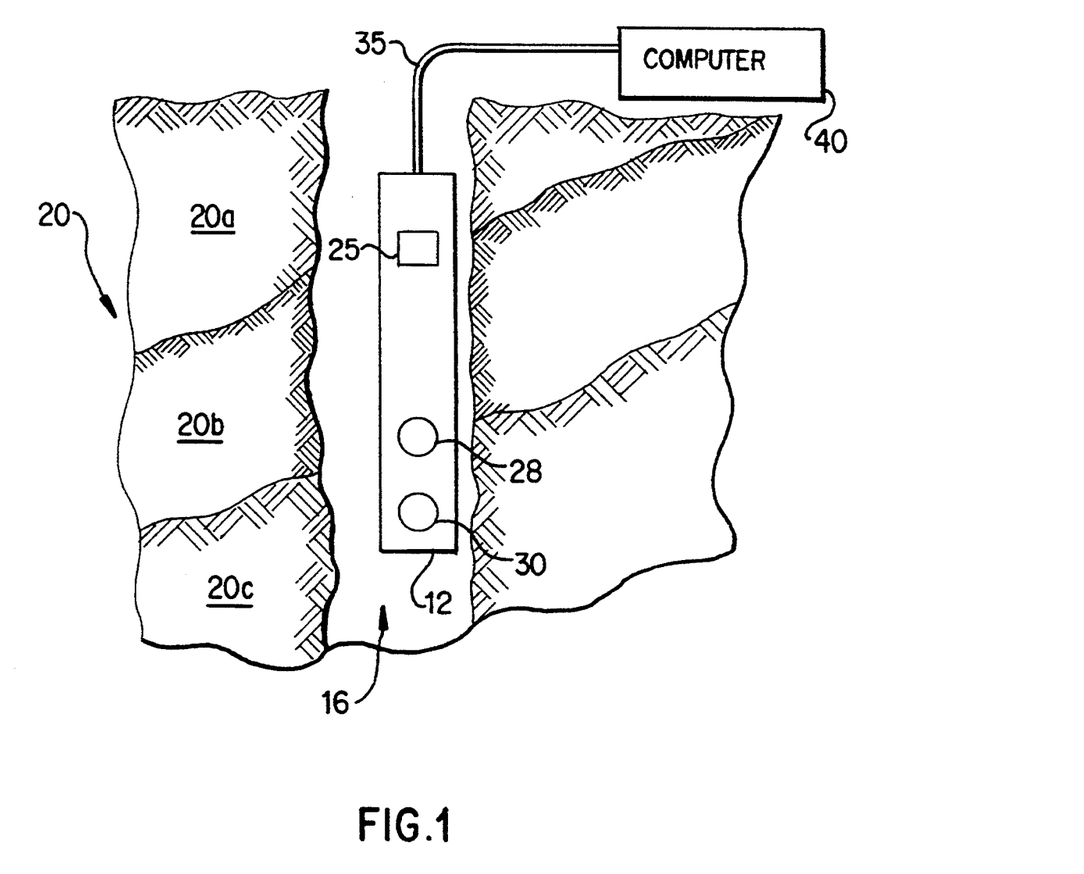
FIG. 1 is a schematic of a well logging tool in a borehole environment.

FIG. 1 is a schematic diagram of a borehole tool 12 suspended in a borehole 16 traversing an earth formation 20. The borehole tool is dragged past numerous layers 20a, 20b, 20c which comprise the earth formation 20. Each formation layer may have different values for various formation properties such as formation density, $P_e$, etc. The borehole tool 12 includes a nuclear source 25, with two detectors 28 and 30, and a cable 35. The cable 35 relays data to a data processor such as a suitably programmed computer 40. The nuclear source 25 may be a monoenergetic gamma ray emitter such as $^{137}Cs$ which provides gamma rays having an energy of 662 KeV. The detectors 28 and 30 may be GSO detectors with associated photomultiplier tubes which measure voltages proportional to the energy of the gamma rays incident on the detectors. Details of the borehole tool 12 are set forth in U.S. Ser. No. 07/281,577. The borehole tool 12 can also comprise a neutron tool, neutron-gamma tool, or natural gamma tool, which would not include the source.

As the borehole tool 12 is dragged in the borehole 16, the detectors 28 and 30 mainly detect gamma rays which have Compton scattered within the formation. The tool collects information regarding the number of detected gamma rays of different energies for predetermined intervals of time (e.g. one second) and forwards the information uphole via the cable 35 to the computer 40 or other processor. The counting rates for the detected gamma rays at different energies are affected by mudcake, rugosity and formation conditions.

The inventors have developed a new method for predicting nuclear tool responses to arbitrary formation conditions, called the sensitivity function technique. The technique relies on the use of sensitivity functions to predict a detector response under a given set of formation conditions relative to a known response in a reference formation. Regional property differences between the reference and the new formation are explicitly accounted for, making predictions for spatially inhomogeneous formations possible. The calculation is performed using vector multiplication. This makes the technique much faster than a complete Monte Carlo simulation.

Sensitivity functions are derived using the 3-D Monte Carlo method as explained in the next section. The sensitivity functions are calculated for each vertical/radial sector within the formation and for each detector in the logging tool.

The efficiency of this invention is illustrated by estimating the amount of computer time required to produce the calculated response curve shown in FIG. 7 described below. Using MCNP, each data point would have taken approximately 2 to 4 cpu hours to reach a statistical precision of less than 3% using the CRAY X-MP computer. Since there were 31 data points, that represents 124 CRAY cpu hours. The sensitivity function technique, on the other hand, took less than 0.4 seconds for a comparable precision on a VAX8600. (This does not include the computer time to produce the sensitivity functions themselves.) Taking into account an approximate 6 to 1 performance enhancement of CRAY over VAX8600 for this class of MCNP problems, the sensitivity function technique can be at least six orders of magnitude faster than the traditional Monte Carlo method.

Figure 2:
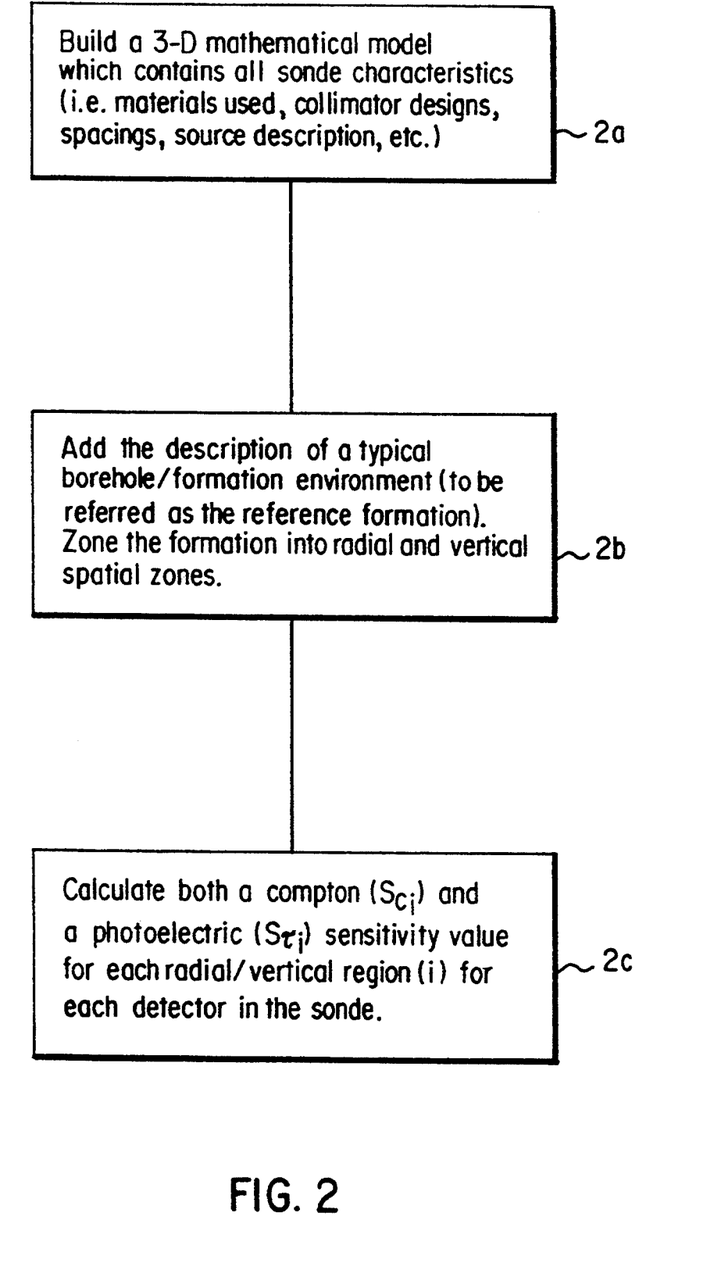
FIG. 2 is a flow chart illustrating the steps for generating sensitivity functions.
Figure 3A:
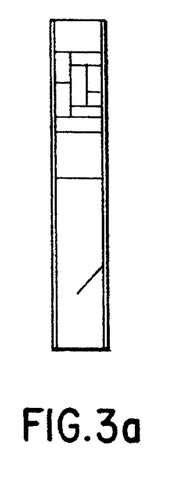
FIGS. 3a–3d illustrate models created according to the steps of FIG. 2.

FIGS. 2a–2c, 3a–3d and 4 illustrate the steps of the present invention. FIG. 2 is a flow chart of steps for deriving the sensitivity functions themselves. Block 2a indicates the building of a 3-D mathematical model containing all characteristics of the logging tool. These characteristics include the materials used in the logging tool, collimator designs, spacings, and type of source, for example. The 3-D mathematical model, shown in FIG. 3a, is built using a Monte Carlo code such as MCNP.

Figure 3B:
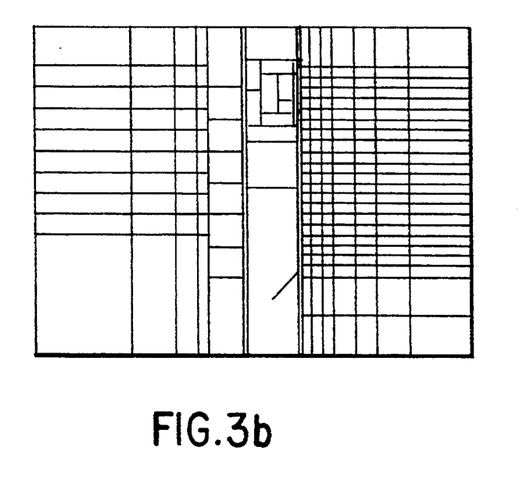

Block 2b indicates that a description of the borehole environment (formation properties, borehole characteristics) in which the tool makes the measurements, is added to the tool model described in block 2a. FIG. 3b is a schematic diagram of the complete tool/borehole and formation environment. The formation used in the model is referred to as the reference formation. The description includes all relevant formation properties. The reference formation is divided into radial and vertical spatial zones for which the sensitivity function will be calculated. The logging tool is shown positioned against the side of the borehole wall and formation. Each zone of the grid of FIG. 3b comprises a three dimensional annular segment or sector within the formation. A set of such annular segments extend along and around one side of the borehole and logging tool. Each zone of the grid of FIG. 3b is designated by a radial and vertical component. The radial component is represented by the radial distance from the logging tool into the formation. The vertical component is represented by the vertical distance along the tool axis. An azimuthal component exists, but is not designated because the angle is the same for each sector.

Block 2c indicates two sets of sensitivities (one for Compton scattering and the other for photoelectric absorption—the dominant physical processes in a density tool) are calculated for each detector in the tool.

Figure 3C:
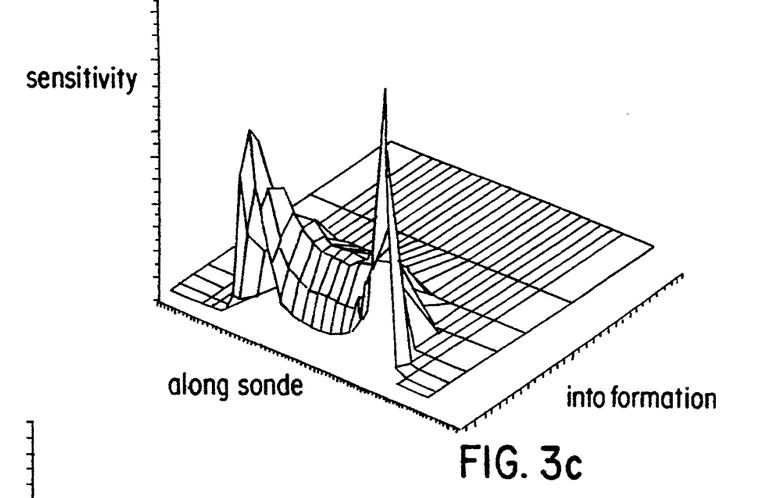
Figure 3D:
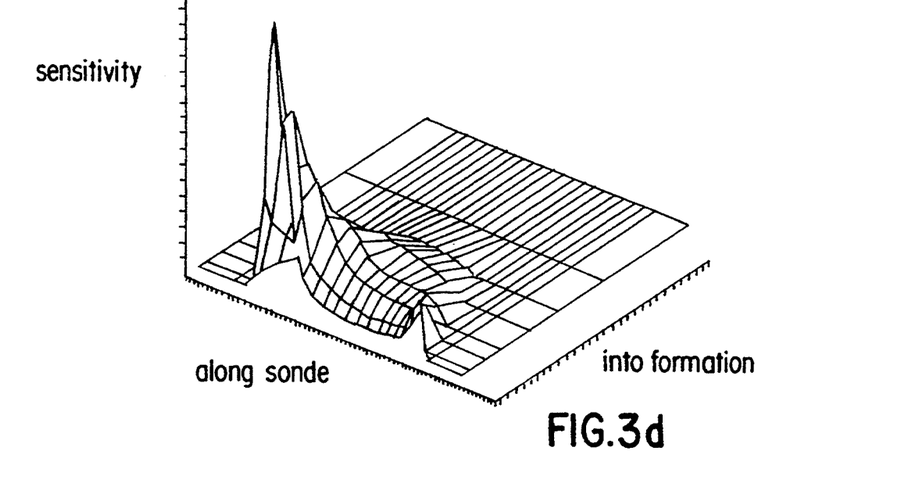

FIGS. 3c and 3d, respectively, show calculated Compton and photoelectric sensitivities for one detector of a typical density logging tool. In FIGS. 3c and 3d, sensitivity is plotted as a function of position along the length of the logging tool as well as a function of depth into the formation. The grid comprising zones in FIGS. 3c and 3d corresponds to the grid of radial/vertical zones of FIG. 3b.

It would appear that the shapes of these sensitivity functions would be a strong function of the formation properties being logged. For this reason, it would also appear that the detector response could not be accurately predicted for an inhomogeneous formation using a fixed set of sensitivity functions. The inventors, however, have found that the sensitivity functions are relatively unaffected by the inhomogeneities of the typical formation.

Figure 4:
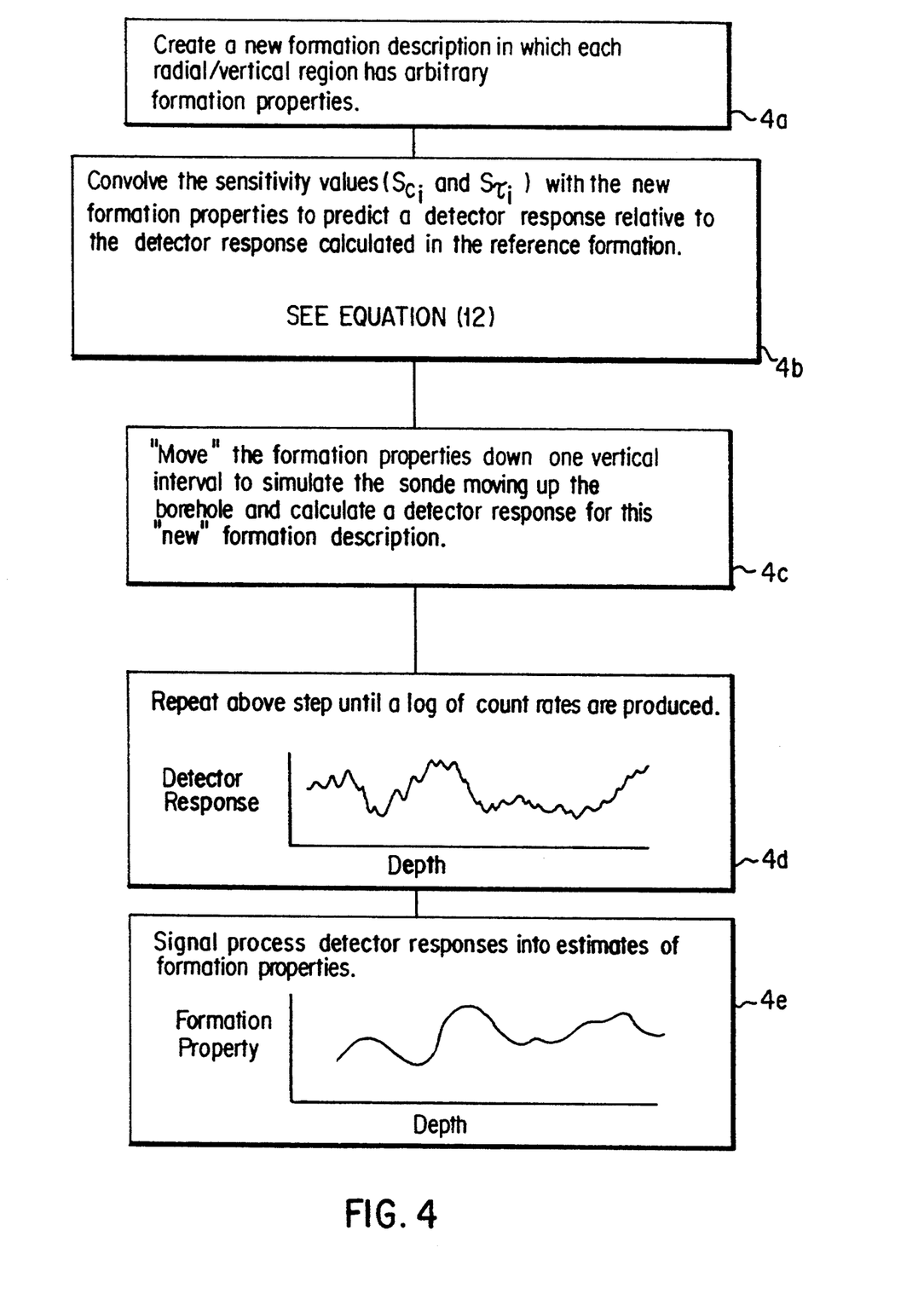
FIG. 4 is a flow chart illustrating the steps for generating a synthetic log.

FIG. 4 is a flow chart of steps for deriving a log according to the present invention. Block 4a indicates that a new formation description (new implies different than the reference formation) is created, in which each radial/vertical zone has arbitrary formation properties. Block 4b indicates that the sensitivity values, Compton and photoelectric, are convolved with the new formation description. In this manner, the new detector response can be predicted relative to the detector response which had been calculated for the reference formation.

Block 4c indicates that formation properties are incremented down one vertical zone at a time to simulate movement of the logging tool up the borehole. Next, a detector response is calculated for this shifted formation description. (The overall formation characteristics remain the same and have only moved relative to the tool. Detector response is merely being examined for the next vertical zone.)

Block 4d indicates that the movement of formation properties in vertical increments is repeated until a log of count rates is produced. Movement of the formation properties continues until a desired number of inches of log have been calculated.

Block 4e indicates that signal processing is applied to the calculated detector responses to estimate formation properties. Such signal processing can be the spine-and-ribs technique which is246 well known in the industry, or any other type of processing which can be applied to interpret the log which has been acquired according to the steps of block 4d.

Figure 5:
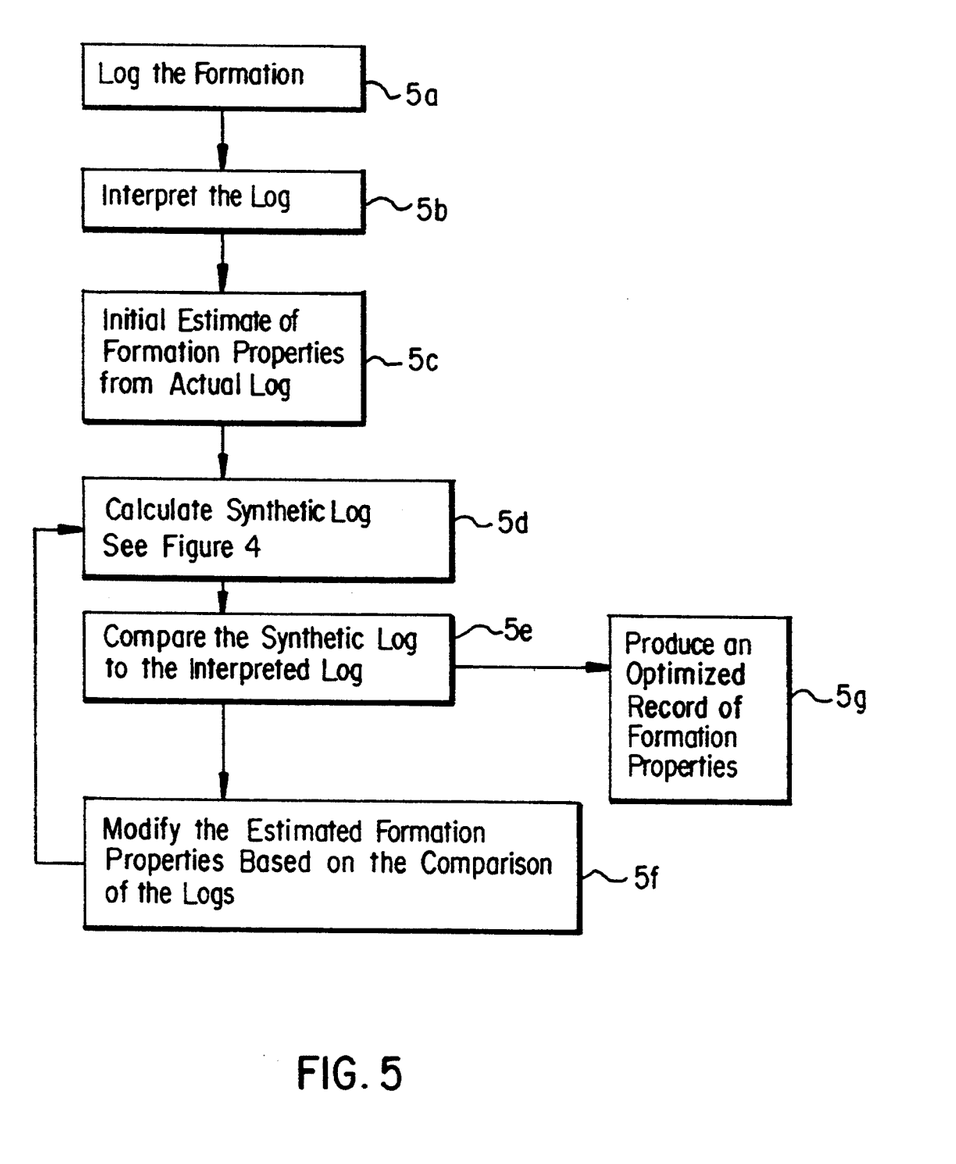
FIG. 5 is a flow chart illustrating the steps of logging a well according to this invention.

FIG. 5 is a flow chart which indicates how the steps of FIGS. 2, 3a–3d and 4 are used in an improved logging method. Block 5a indicates that an actual log is made of the formation. Here, the logging tool 12 of FIG. 1 traverses the borehole. Detectors within the tool detect radiation scattered within from the formation. Block 5b indicates that the actual log is interpreted. This interpretation may be performed according to the spine-and-ribs technique discussed earlier. From this interpretation, Block 5c indicates that the formation properties are estimated from the actual log. These estimated properties are used in determining the predicted detector responses indicated in Block 4b.

Block 5d indicates that the synthetic log is calculated according to FIG. 4, Blocks 4a–4e, using the estimated formation properties of Block 5c as initial formation properties. Block 5e indicates that the synthetic log of Block 4e is compared to the actual log produced according to Blocks 5a–b. In light of this comparison, Block 5f indicates that the initialized formation properties used in Block 5d are modified. This modification continues until the synthetic log and the actual log are substantially similar at Block 5e. When this similarity occurs, an optimized record is produced which indicates the formation properties as Block 5g indicates, such as the delineation of bed boundaries.

Details follow which explain the technique illustrated by FIGS. 2, 3a–3d, 4 and 5.

Generation of the Sensitivity Functions

The first step in the generation of the sensitivity functions is to build a mathematical description of the tool. This involves the use of a 3-D modeling package such as MCNP in which all details of the actual tool design can be accurately reproduced. Sensitivity functions are calculated for a specific borehole and formation environment, and therefore adding their description is the next step in the process. The formation is zoned into arbitrarily sized radial and vertical zones for which estimates of the sensitivity functions will be made.

The sensitivity functions themselves are calculated with a modification to the MCNP transport code developed by the inventors. The modification is based on perturbation theory applied to the Boltzmann transport equation. Before the details of the sensitivity function theory is given, a background summary of what density sensitivity is would be instructive. Density sensitivity relates a change in formation density to a change in detector response. It is a strong function of tool design (e.g. source energy, collimation, shielding, detector spacing, etc.) as well as a function, to some degree, of the formation material being logged. The detector sensitivity relates a change in the formation's density from one uniform value to another, and is referred to as the "integral density sensitivity". Measurements have shown that a typical detector response decreases exponentially with increasing density. The rate at which the natural log (ln) of the count rate changes with density is the integral density sensitivity.

The sensitivity of the detector response can also be considered in terms of the dominant physical reactions that the gamma rays experience as they travel between the source and detector. For the case of a gamma-gamma density tool, Compton scattering and photoelectric absorption are the two dominant physical reactions. The application of perturbation theory to derive the necessary relationships is discussed next. Consider an integral response parameter, R, defined by $$R = \int dt \int dEd\Omega \int dr \phi(r,E,\Omega,t)\chi(r,E,\Omega,t) \tag{1}$$

where $\chi$ is a specified response function and $\Phi$ is the neutron or gamma-ray flux governed by the inhomogeneous transport equation. It is well known that the first order variation of R, for the case in which both the source and response functions remain unperturbed, may be expressed as $$\delta R = \int dt \int dEd\Omega \int dr \phi^t \delta L \phi \tag{2}$$

where $\delta L$ refers to the variation of the transport operator with respect to macroscopic interaction cross sections and $\Phi^+$ is the solution of the adjoint transport equation having $\chi$ as a source function. If we now assume that the variations in the total and differential cross sections appearing in $\delta L$ are such that $$\frac{\delta(\rho_i \sigma_i)}{\rho_i \sigma_i} \neq \frac{\delta(\rho_i \sigma_i)}{\rho_i \sigma_i}(E,t) \text{ and,} \tag{3}$$

$$\delta d\sigma_i(E',\Omega' \to E,\Omega) = d\sigma_i(E',\Omega' \to E,\Omega)\frac{\delta\sigma_i}{\sigma_i} \tag{4}$$

then Equation (2) has the form $$\frac{\delta R}{R} = \sum_i \int dR\, S_i(r) \frac{\delta[\rho_i(r)\sigma_i(r)]}{\rho_i \sigma_i} \text{ where} \tag{5}$$

$$S_i(r) = \left\{ \frac{1}{R} \int dEd\Omega \int dt[\phi^t \int \rho_i d\sigma_i \phi - \phi^t \rho_i \sigma_i \phi] \right\} \tag{6}$$

is the differential relative sensitivity function for interaction type i. Note that $S_i$ has the dimensions of a spatial density. Note also that $S_i$ is independent of the specification of any finite perturbation size. Equality holds in Equation (4) if we are concerned only with changes in the densities (or concentrations) of elemental species, in which case $S_i$ is an elemental density sensitivity function. This is the approach used for neutron tools. More generally, $S_i(r)$ is the appropriate sensitivity function for certain gamma-ray transport problems in which one considers not only perturbations in the density of the transporting medium, but changes in its elemental composition as well. In particular, Equation (4) is a good approximation for changes in the Compton scattering of gamma-rays in the presence of elemental composition changes, representing the neglect of the binding of the electron. Equations (3) and (6) also provide an appropriate expression for the photoelectric absorption sensitivity in the case of compositional changes, to the extent that the Z and E dependencies of the photoelectric cross section are approximately separable. These approximations are quite adequate for a variety of gamma-ray logging and other nuclear shielding applications.

In the above equations and discussion:

r = spatial position
t = time
E = energy
$\Omega$ = angle
$\rho$ = number density of scattering
$\sigma_i$ = total cross section of type i
$d\sigma_i$ = differential cross section of type i
Z = atomic number The first term of $S_i$ is related to the interaction density of those particles which eventually score in the specified detector, while the second term is proportional to the product of the total interaction density and the adjoint (importance) function. Thus $S_i$ may be estimated in a Monte Carlo calculation by tallying the total collision densities, the collision densities for scoring tracks, and the adjoint flux in each cell. The adjoint flux may be estimated in a forward calculation by means similar to those used for the MCNP weight window generator (J. S. Hendricks, "A Code-Generated Monte Carlo Importance Function,"*Trans. Am. Nuc. Soc.*, 41,307, 1982).

Alternatively, the second term of Equation (6) may be estimated by tallying the track length of scoring particles in each computational cell, weighted by their instantaneous mean free path (R. Lawrence, private communication). Both algorithms have been successfully implemented through modifications of the MCNP transport code. Most of the results which we report here have been computed using this second algorithm. The required modifications to MCNP consist primarily of the addition of certain FORTRAN statements which cause the program to compute the number of interactions and the total weighted track length in each computational cell for each particle which eventually contributes to a specified response.

Previous applications of sensitivity analysis to nuclear design problems have relied extensively on the use of one and two dimensional discrete-ordinates computational techniques (S. A. W. Gerstl et al., "Cross Section Sensitivity and Uncertainty Analysis with Application to a Fusion Reactor, "*Nuc. Sci. Eng.*, 62, 137, 1977 and C. R. Weisbin et al., "Application of Sensitivity and Uncertainty Methodology to Fast Reactor Integral Experiment Analysis,"*Nuc. Sci, Eng,*. 66, 307, 1978). Our use here of the MCNP Monte Carlo code enables us to perform full three dimensional sensitivity analyses for realistic geometries.

In order to treat the finite cross section and response variations of practical interest, the infinitesimal perturbations of Equation (5) must be integrated to finite values. A simple physical model of attenuation type nuclear measurement implies that the quantity $$\frac{S_i}{\rho_i \sigma_i}$$

is relatively insensitive to variations in the cross sections. We therefore treat the left side of Equation (5) as a logarithmic differential, the right side as a linear differential and integrate to obtain:

$$\ln\left(\frac{R}{R^{ref}}\right) = \sum_i \int S_i(r) \frac{\Delta(\rho_i\sigma_i)(r)}{(\rho_i\sigma_i)^{ref}} dr \quad (7)$$

where $\Delta(\rho_i\sigma_i) = \rho_i\sigma_i - (\rho_i\sigma_i)^{ref}$. Our experience suggests that this form for the measurement equation is appropriate for many nuclear responses, but other interactions are possible. In fact, it is known that for certain types of measurements, a linear-linear integration is preferred, which would yield the model:

$$\frac{\Delta R}{R^{ref}} = \sum_i \int S_i(r) \frac{\Delta(\rho_i\sigma_i)}{(\rho_i\sigma_i)^{ref}} dr \quad (7a)$$

where $\Delta R = R - R^{ref}$.

To this point, we have discussed the cross section variations and sensitivities as continuous functions. However, since a nuclear tool produces a finite set of discrete measurements, it is appropriate when considering the modeling of such data to introduce a discretization of the formation's properties and corresponding sensitivity functions. Although such a discretization may be accomplished in many ways, probably the simplest is to define a cylindrical mesh in the fomation having a depth dimension, indexed by $Y_n$, equal to the measurement interval, and one or more radial bins, indexed by $r_k$; perhaps a "mudcake" region and a "formation"region. (Azimuthal angular structure could also be included.) With each spatial cell (n, k) is associated a set of densities and cross section values, $\{\rho_i, \sigma_i\}_{n,k}$ which represent a weighted average of the continuous functions over this cell, and a set of sensitivity values, $\{S_i\}_{n,k}$ which are the integrals of the sensitivity functions in the cell. As the tool moves up the borehole, it transmits a measurement $R(y_n)$ at each measurement point, $y_n$. As it moves, it carries its sensitivity functions along, so that Equation (7) represents a convolution operation in the depth domain, with $S_i$ being the convolution kernel. Note that when the tool is in motion its effective sensitivity functions are related to the stationary functions by a convolution over the measurement interval. We assume here that the discretization and the measurement interval are translationally invariant. In discretized form the measurement equation may thus be written as, $$\ln\left(\frac{R(y_n)}{R^{ref}}\right) = \sum_{n'} \sum_k \sum_i S_i(y_{n'} - y_n, r_k) \frac{\Delta(\rho_i\sigma_i)(y_{n'},r_k)}{(\rho_i\sigma_i)^{ref}} \quad (8)$$

Equation (8) forms the basis of the sensitivity function modeling technique. The values of $S_i(y_n, r_k)$ are computed using the modified MCNP code described above on a computational mesh which may coincide with, or else be interpolated to the "modeling" mesh involved in Equation (8). If the formation to be modeled is spatially uniform, then Equation (8) reduces to $$\ln\left(\frac{R}{R^{ref}}\right) = \sum_i S_i \frac{\Delta(\rho_i \sigma_i)}{(\rho_i \sigma_i)^{ref}} \quad (9)$$

The $S_i$ values here are referred to as the "integral" sensitivities, and represent the sum of $S_i(y_n, r_k)$ over all mesh cells. To improve the accuracy of the technique, certain of the values of the $\{S_i\}$ and/or the $S_i(y_n, r_k)$ may be calibrated by or determined from experimental measurements.

Compton, photoelectric and density sensitivities

For gamma-gamma logging tools having source energies below 1 MeV, only Compton and photoelectric interactions are important. The Compton cross section per electron, $\sigma_c$, is approximately independent of atomic number Z, while the photoelectric cross section per electron $\sigma_\tau$, is approximately proportional to $$P_e \equiv \left(\frac{Z_{eff}}{10}\right)^{3.6}.$$

Therefore, for any variation of formation composition or density:

$$\frac{\Delta \rho_e \sigma_c}{(\rho_e \sigma_c)^{ref}} = \frac{\Delta \rho_e}{\rho_e^{ref}} \quad \text{and,} \quad (10)$$

$$\frac{\Delta \rho_e \sigma_\tau}{(\rho_e \sigma_\tau)^{ref}} = \frac{\Delta \rho_e P_e}{(\rho_e P_e)^{ref}} \quad (11)$$

so that Equation (8) can be written:

$$\ln\left(\frac{R}{R^{ref}}\right) = \quad (12)$$

$$\sum_{n'} \sum_k \left\{ S_c(y_{n'} - y_n, r_k) \frac{\Delta \rho_e}{\rho_e^{ref}} + S_\tau(y_{n'} - y_n, r_k) \frac{\Delta(\rho_e P_e)}{(\rho_e P_e)^{ref}} \right\}$$

This equation shows how gamma-gamma tool responses can be modeled in terms of formation electron density and $P_e$ according to the sensitivity function technique. In well logging, one is often interested, however, in determining the mass density, $\rho_b$, of a formation. The relationship between $\rho_e$ and $\rho_b$ is $\rho_e = 2(Z/A)\rho_b$. For most formation materials of interest, $Z/A$ is approximately $\frac{1}{2}$, so $\rho_e \approx \rho_b$ and therefore $\rho_e$ in Equation 12 can be replaced by mass density $\rho_b$.

If it is assumed that the sensitivity functions, over a reasonable range of formation and standoff conditions, do not vary, Equation (8) describes a new and powerful technique for predicting a detector's response to regional density and $\rho_e$ changes within the formation, not just to uniform changes. The inventors have demonstrated that it is possible to rapidly calculate detector responses to borehole rugosity, thin beds, bed boundaries, and other inhomogeneous formation conditions using this technique.

The ultimate proof of the usefulness of this approach is the accuracy with which the sensitivity function technique can calculate detector count rates under various borehole and formation conditions. Some of the benchmarking that has been performed to test the validity of Equation (8) and to demonstrate the limits of its applicability is described below. Before proceeding directly to the benchmarking results, however, it would be instructive to go back and look at the sensitivity values displayed in FIGS. 3c and 3d in more detail.

FIGS. 3c and 3d display Compton sensitivities, $S_c$ $(Y_{n'} - y_n, r_k)$, and photoelectric sensitivities, $S_\tau(Y_{n'} - Y_n, r_k)$, respectively, for an uncollimated detector and a 662 KeV line source for a detection energy above 200 KeV. The sensitivities were calculated in a uniform epoxy-gravel formation with $\rho_e = 2.096$ g/cc and $\rho_e = 1.42$. Even though the cell sensitivities have statistical uncertainties associated with them, no error bars are shown for clarity, and the data points have been smoothed in a manner consistent with these uncertainties.

The shape of the Compton sensitivity map shown in FIG. 3c is dominated within the first inch of the formation by two large peaks, one immediately in front of the source location (peak on the right) and the other in front of the detector (peak on the left). Beyond the first inch of formation, the shape becomes more "boxcar" like, indicating a more uniform importance of the formation to the detector response. (The peaks in the shallow region determine how borehole rugosity affects detector response. C. Flaum, J. Holenka and C. Case, "Eliminating the Effects of Rugosity on Density Logs", 64th Annual Technical Conference and Exhibition of the SPE, Oct. 8-11, 1989, San Antonio, Tex. C. Flaum, "Eliminating the Effects of Rugosity from the HLDT Logs by Geometrical Response Matching," SWS-E Engineering Report: IE-PETRO.9, Feb. 15, 1989.)

On the other hand, the photoelectric sensitivity map shown in FIGS. 3d, also for a detection energy above 200 KeV, is quite different. The Figures show that the sensitivity of the detector to changes in photoelectric cross sections is concentrated in front of the detector, not in front of both the detector and the source as was the case for the Compton sensitivities. This implies that the photoelectric effect is mainly due to interactions that are close to the borehole wall as theorized by Bertozzi, et. al. (Bertozzi, W., Ellis, D. V. and Wahl, J. S., "The Physical Foundations of Formation Lithology Logging with Gamma Rays", Geophysics, 46, Oct. 1981, No. 10). At these detection energies, the absolute magnitude of the photoelectric sensitivities is $\approx 300$ times smaller than the corresponding Compton values, and therefore, the first term on the right hand side of Equation (12) dominates.

BENCHMARKING

A. Rugosity Log

The first set of benchmark comparisons made were between count rates calculated using the sensitivity function technique and experimental data taken under simulated borehole rugosity conditions.

Figure 6:
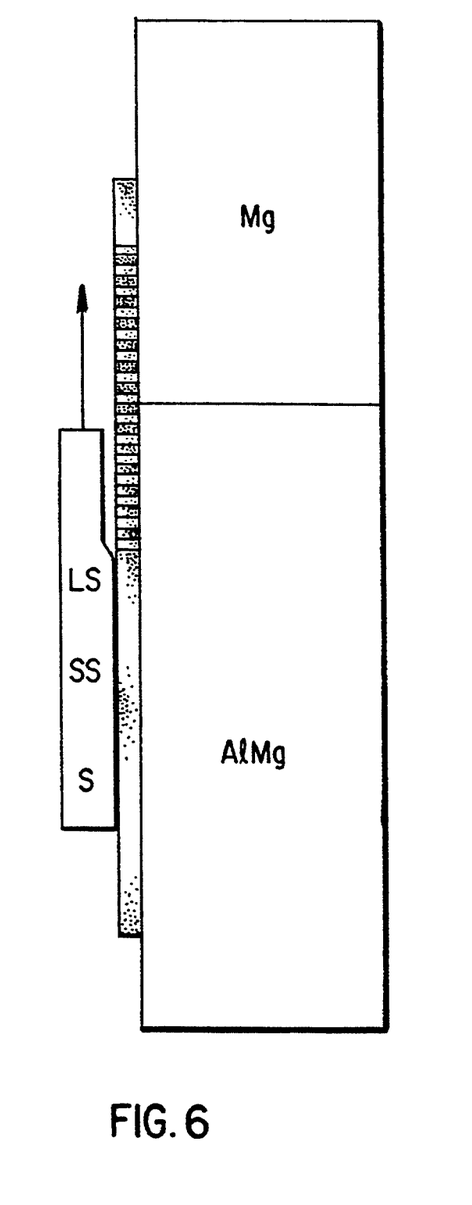
FIG. 6 is a schematic diagram of a simulated bed boundary having a washboard pattern of rugosity between the tool and the formation.

FIG. 6 displays a schematic of one simulated rugosity setup. In this case, two large blocks with 8" boreholes, AlMg at 2.55 g/cc and Mg at 1.7 g/cc, were stacked on top of one another to produce a bed boundary. To simulate a "washboard" pattern of rugosity, an aluminum sleeve with a series of ¼" deep by 1" high grooves was inserted into the borehole. Once the experimental setup was completed, the tool was pulled slowly up the borehole with sampling every 0.05 inches.

Figure 7:
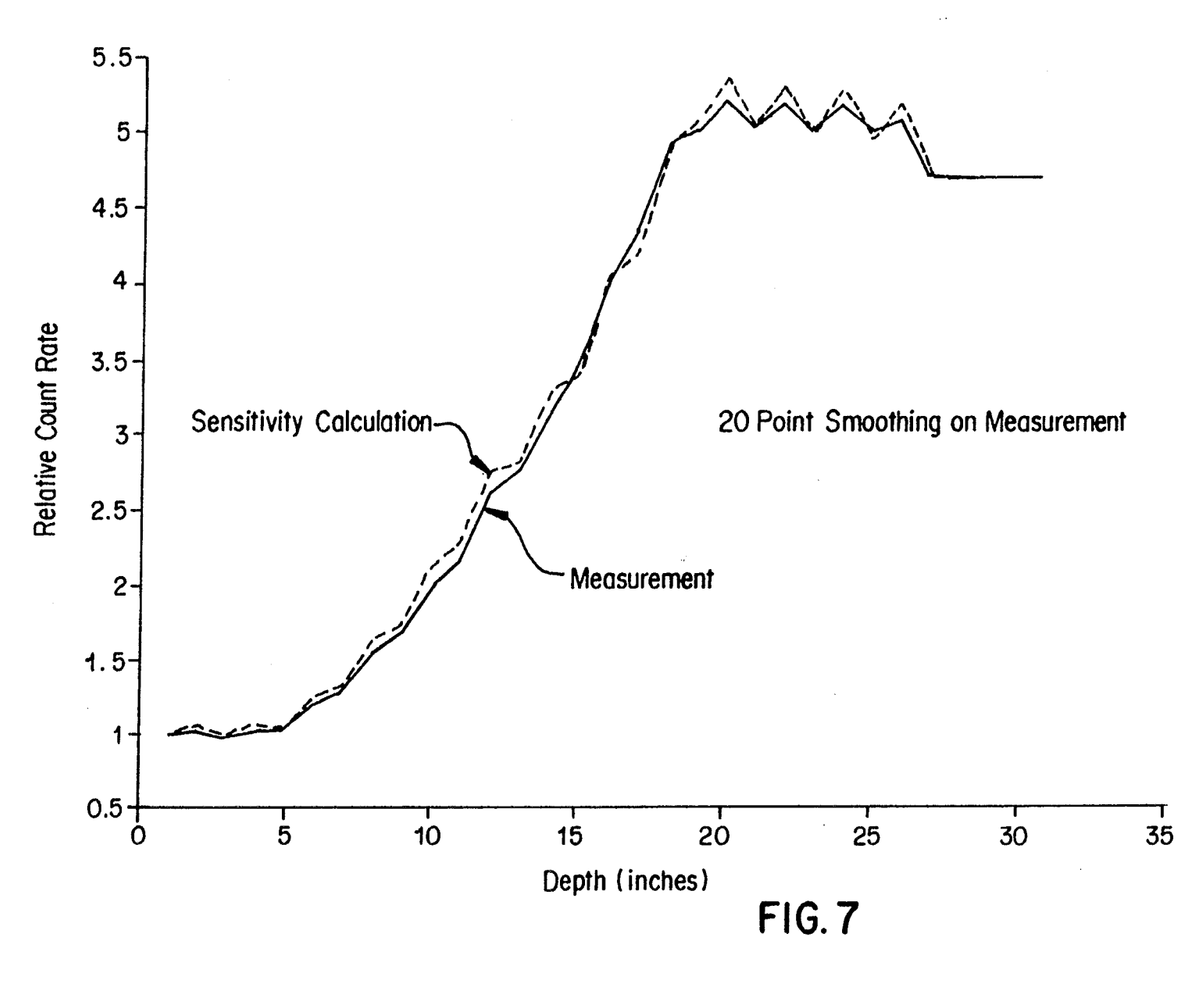
FIG. 7 is a comparison between measured and calculated count rates under simulated rugosity conditions.

FIG. 7 shows a comparison between sensitivity derived count rates and experimental measurements. Even though the point by point agreement is not identical, the two curves are well within the combined statistical precision of the calculation and measurement. This level of agreement is, therefore, considered excellent. In particular, the sensitivity function technique was able to predict the absolute count rate change between the two blocks as well as the "saw-tooth" pattern due to the rugosity sleeve.

B. LDT (Litho-Density Tool, mark of Schlumberger) Calibration Data Base

Benchmark comparisons were also made between measured data extracted from an LDT (Litho-Density Tool) calibration data base and count rates calculated via the sensitivity function technique. This represents a test of the technique's ability to reproduce measured results under static conditions, as opposed to the dynamic benchmarking described above.

The LDT calibration data base includes measured detector count rates for a wide variety of different formations, with and without the presence of simulated mudcakes. (Mudcakes are typically classified as either barite loaded or non-barite loaded depending upon whether or not the element barium was used in the original mud mixture.) The sensitivity function technique was used to estimate the observed counting rates under all formation/mudcake conditions contained within the data base. The estimated count rates were then convened into apparent formation densities according to the standard spine-and-ribs processing.

Figure 8:
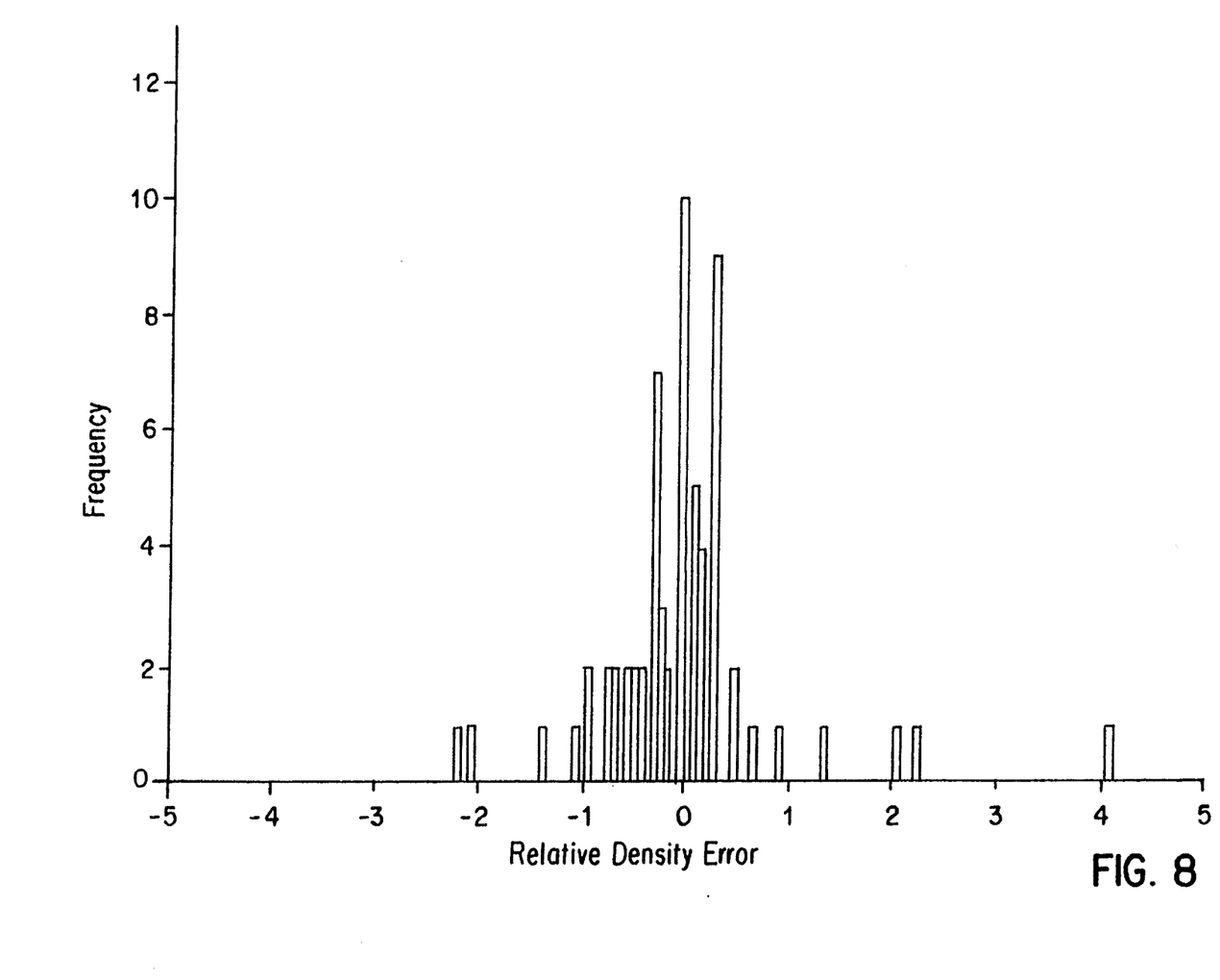
FIG. 8 is a histogram of relative density error in non-barite muds.
Figure 9:
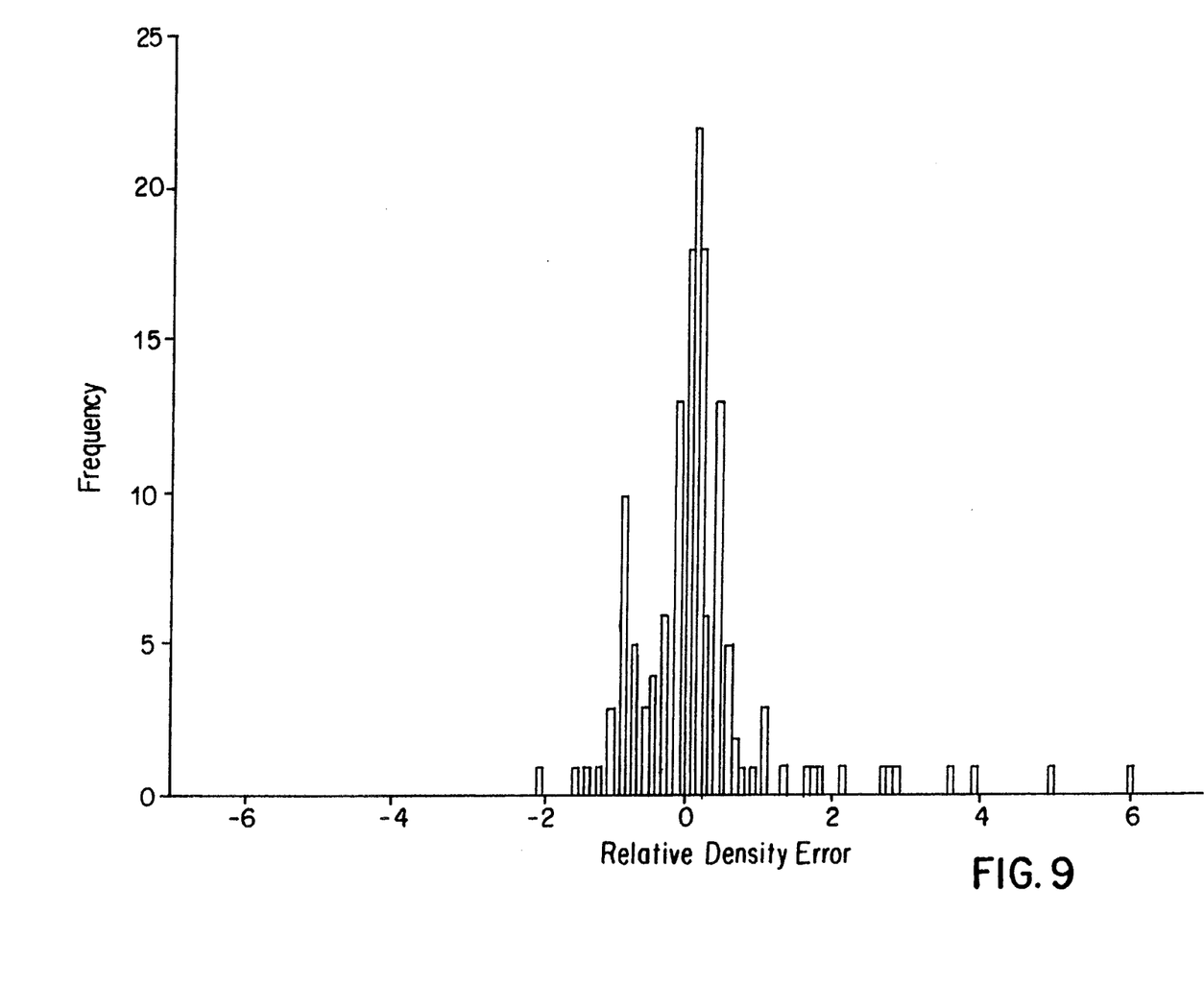
FIG. 9 is a histogram of relative density error in barite muds.

FIG. 8 is a histogram of the relative error in the estimated density compared to the density derived from the measured count rates for non-barite muds. An analysis of the histogram data reveals a mean relative error of −0.04% and a standard deviation of 0.9%. This level of accuracy and precision is considered excellent. A similarly encouraging result was obtained for barite loaded mudcakes as shown in FIG. 9. Under these conditions, the mean relative error is 0.17% with a standard deviation of 1.0% which is again excellent agreement.

The conclusions drawn from these benchmark comparisons are that the sensitivity function technique is very accurate and that it is capable of predicting detector count rates under a wide range of different formation/mudcake conditions.

We claim:

1. A method of logging a fomation comprising:
   traversing a borehole in the formation with a logging tool;
   detecting nuclear radiation in the formation with nuclear detectors in the tool;
   producing a first log of data representing the detected nuclear radiation which indicates formation density and formation photoelectric absorption;
   calculating separate Compton sensitivity values and photoelectric sensitivity values for each of a plurality of three dimensional sectors of the formation;
   using the data of the first log and the sensitivity values to predict responses of the nuclear detectors in the tool such that the predicted responses are calculated as a function of formation density and formation photoelectric absorption of each three dimensional sector and such that the predicted responses vary as the logging tool traverses the borehole; and
   producing a record of formation properties in light of the predicted nuclear detector responses and the data of the first log.

2. The method of claim 1, comprising: producing a synthetic second log of the predicted detector responses; and comparing the first log of data to the synthetic second log to produce the record of formation properties.

3. The method of claim 2, wherein:
   the data of the first log represents an estimation of formation properties and is used in predicting responses of the detectors in the tool;
   the steps further comprising: modifying the estimation of formation properties based on a comparison of the first log of data and the synthetic second log.

4. The method of claim 3, comprising: producing a three dimensional model of the tool, borehole, and formation; and using the three dimensional model to calculate the sensitivity values for the at least one characteristic.

5. A method of logging a formation comprising:
   traversing a borehole in the formation with a logging tool;
   detecting nuclear radiation in the formation with nuclear detectors in the tool;
   producing a first log of data representing the detected nuclear radiation and an estimation of formation properties including formation density and formation photoelectric absorption as a function of borehole depth;
   producing a three dimensional model of the tool, borehole, and formation;
   using the three dimensional model to calculate separate Compton sensitivity values and photoelectric sensitivity values for each of a plurality of three dimensional sectors of the formation;
   using the estimation of formation properties and the sensitivity values to predict responses of the nuclear detectors in the tool such that the predicted responses are calculated as a function of borehole depth, formation density and formation photoelectric absorption;
   producing a synthetic second log of the predicted nuclear detector responses;
   comparing the synthetic second log to the first log of data;
   modifying the estimation of formation properties based on the comparison of the synthetic second log and the first log of data; and
   producing a record indicating formation properties when the synthetic second log and first log of data are substantially similar.

6. A method of logging a formation comprising:
   traversing a borehole in the formation with a logging tool;
   detecting nuclear radiation in the formation with nuclear detectors in the tool;
   producing a first log of data representing an estimation of fomation density and formation photoelectric absorption, $P_e$ in light of the detected nuclear radiation;
   producing a three dimensional model of the tool, borehole, and formation;

using the three dimensional model to calculate separate Compton sensitivity values and photoelectric sensitivity values for each of a plurality of three dimensional sectors of the formation;

using the estimation of formation properties and the sensitivity values to predict responses of the nuclear detectors in the tool for each three dimensional sector such that the predicted responses are calculated as a function of borehole depth, formation density and formation $P_e$ and such that the predicted responses vary as the logging tool traverses the borehole;

producing a synthetic second log of the predicted nuclear detector responses;

comparing the synthetic second log to the first log of data;

modifying the estimation of formation properties based on the comparison of the synthetic second log and the first log of data; and producing a record indicating formation properties when the synthetic second log and first log of data are substantially similar.

* * * * *